(12) United States Patent
Keller et al.

(10) Patent No.: US 7,700,710 B2
(45) Date of Patent: *Apr. 20, 2010

(54) PYROLYTIC FORMATION OF METALLIC NANOPARTICLES

(75) Inventors: Teddy M Keller, Fairfax Station, VA (US); Manoj K. Kolel-Veetil, Alexandria, VA (US); Syed B Qadri, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/051,179

(22) Filed: Mar. 19, 2008

(65) Prior Publication Data

US 2008/0227624 A1 Sep. 18, 2008

Related U.S. Application Data

(63) Continuation-in-part of application No. 11/239,454, filed on Sep. 27, 2005, now Pat. No. 7,579,424.

(60) Provisional application No. 60/895,749, filed on Mar. 20, 2007.

(51) Int. Cl.
*C08G 79/08* (2006.01)
*C08G 77/398* (2006.01)
*C08G 79/00* (2006.01)

(52) U.S. Cl. .................. 528/25; 528/394; 528/395

(58) Field of Classification Search .............. 501/154; 977/742

See application file for complete search history.

(56) References Cited

U.S. PATENT DOCUMENTS 4,835,230 A * 5/1989 Khasat et al. ................ 526/221

(Continued)

OTHER PUBLICATIONS

Corriu et al., Journal of Organometallic Chemistry, 1996, 509, 249-257.*

*Primary Examiner*—Randy Gulakowski
*Assistant Examiner*—Robert Loewe
(74) *Attorney, Agent, or Firm*—Amy L. Ressing; Joseph T. Grunkemeyer

(57) ABSTRACT

A method and a ceramic made therefrom by: providing a composition of a compound having the formula below and a metallic component, and pyrolyzing the composition. R is an organic group. The value n is a positive integer. Q is an acetylenic repeat unit having an acetylene group, crosslinked acetylene group, $(ML_x)_y$-acetylene complex, and/or crosslinked $(ML_x)_y$-acetylene complex. M is a metal. L is a ligand. The values x and y are positive integers. The metallic component is the $(ML_x)_y$-acetylene complex in the compound or a metallic compound capable of reacting with the acetylenic repeat unit to form the $(ML_x)_y$-acetylene complex. The ceramic comprises metallic nanoparticles.

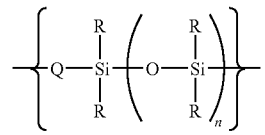

20 Claims, 10 Drawing Sheets

U.S. PATENT DOCUMENTS

| | | | |
|---|---|---|---|
| 4,906,710 A * | 3/1990 | Burns et al. | 525/474 |
| 5,276,119 A * | 1/1994 | Kelsey | 526/170 |
| 5,958,324 A * | 9/1999 | Bujalski et al. | 264/470 |
| 5,986,032 A * | 11/1999 | Keller et al. | 528/5 |
| 6,759,502 B1 * | 7/2004 | Sun et al. | 528/9 |
| 2003/0108477 A1 * | 6/2003 | Keller et al. | 423/447.1 |
| 2004/0234440 A1 | 11/2004 | Keller | |
| 2005/0171317 A1 * | 8/2005 | Keller et al. | 528/31 |

\* cited by examiner

PYROLYTIC FORMATION OF METALLIC NANOPARTICLES

The application claims the benefit of U.S. Provisional Patent Application Ser. No. 60/895,749, filed on Mar. 20, 2007. This application is a continuation-in-part application of application Ser. No. 11/239,454 filed on Sep. 27, 2005 now U.S. Pat. No. 7,579,424. All referenced publications and patent documents are incorporated herein by reference.

BACKGROUND OF THE INVENTION

1. Field of the Invention

The invention generally relates to ceramic materials.

2. Description of Related Art

The synthesis of materials with nanoscale dimensions is one of the most sought after technologies today, as particle size reduction has been postulated to lead to dramatic changes in physical properties. For example, typical ferromagnetic materials exhibit superparamagnetic behavior at particle sizes of 10-15 nm (Cao et al., "Controlling the particle size of amorphous iron nanoparticles," *J. Mater. Res.*, 10, 2952 (1995). One of the most pressing technology needs today is to find more efficient ways to store and process digital information. One of the possibilities to squeeze more data onto storage devices is by making the currently used magnetic nanoparticles even smaller. Similarly, nanosized superconductors could be used as an active component of novel nanocomposites with advanced useful properties and as principal building blocks of nanoelectronics as well as elements of solid-state quantum bits (qubits) (Schmidt, *The Physics of Superconductors* [Springer-Verlag, Berlin, 1997]). There are currently very few processes available, which can reliably produce nanomagnetic, semiconducting, or superconducting materials of desired sizes under mild conditions.

Most transition metal-based polymers reported to date do not contain units for conversion to a thermoset and thus afford low char yields at elevated temperatures. Carboranylenesiloxanes are highly sought after high temperature, thermally and thermo-oxidatively stable polymers (Dvornic et al., *High temperature Siloxane Elastomers*; Huthig & Wepf: Heidelberg, Germany (1990)). These materials are desirable, especially when it comes to their thermo-oxidative stabilities at very high temperatures. The introduction of unsaturated cross-linkable units such as a diacetylene unit in such materials resulted in the production of extended polymer networks of carboranylenesiloxanes (Henderson et al., "Synthesis and Characterization of Poly(carborane-siloxane-acetylene)," *Macromolecules*, 27(6), 1660 (1994)).

Spintronics: Spintronics (spin transport electronics or spin-based electronics) is a conceptual technology wherein the spin of an electron rather than its charge carries information ((a) Datta et al., *Appl. Phys Lett.*, 56, 665-667 (1990); (b) Wolf et al., *Science*, 294, 1488-1495 (2001); (c) von Molnar et al., *Proceedings of the IEEE*, 91, 715-726 (2003)). This offers opportunities for a new generation of devices that combine standard microelectronics with spin-dependent effects that arise from the interaction between the spin of the carrier (electron) and the magnetic properties of a material. If the spin degree of freedom is used alone or is added to conventional semiconductor charge-based electronics, it will substantially increase the capability and performance of electronic products. The advantages of such products would be nonvolatility, increased data processing speed, decreased electric power consumption, and increased integration densities compared with conventional semiconductor devices.

Recently in the area of spin-polarized electronic transport, the giant magnetoresistance effect (GMR) has rapidly transitioned from discovery to commercialization for applications in magnetic information storage (Prinz, *Science*, 282, 1660-1663 (1998)). GMR is a quantum mechanical effect observed in layered magnetic thin-film structures that are composed of alternating layers of ferromagnetic and nonmagnetic layers (Baibich et al., *Phys. Rev. Lett.*, 61, 2472-2475 (1988)). When the magnetic moments of the ferromagnetic layers are parallel, the spin-dependent scattering of the carriers is minimized, and the material has its lowest resistance. When the ferromagnetic layers are anti aligned, the spin-dependent scattering of the carriers is maximized, and the material has its highest resistance. The directions of the magnetic moments are manipulated by external magnetic fields that are applied to the materials. These materials can now be fabricated to produce significant changes in resistance in response to relatively small magnetic fields and to operate at room temperature.

Magnetic semiconductors: Magnetic semiconductors are materials in which components exhibiting both ferromagnetism (or a similar response) and useful semiconductor properties are present in a single material (FIG. 8). If implemented in devices, these materials could provide a new type of control of conduction. Whereas traditional electronics are based on control of charge carriers (n- or p-type), practical magnetic semiconductors would also allow control of quantum spin state (up or down). This would theoretically provide near-total spin polarization (as opposed to iron and other metals, which provide only ~50% polarization), which is an important property for spintronics applications, e.g. spin transistors.

In normal, nonmagnetic conductors, electronic energy does not depend on the spin direction. It is not possible to distinguish between spin-up and spin-down electrons. In magnetic semiconductors, the d electrons of the magnetic ions influence the s and p electrons, and the conduction and valence band are split depending on the spin direction (Zeeman splitting) (adapted from Ando, *Science*, 312, 1883-1885 (2006)).

The search for materials containing ferromagnetic and semiconducting properties has been a long-standing and challenging one because of the need to balance the differences in crystal structure and chemical bonding in such materials ((a) Tanaka, *J. Crystal Growth*, 201/202, 660-669 (1999); (b) Prinz et al., *Phys. Today*, 48, 24 (1995)). A recent surge in a worldwide effort to create all electronic semiconducting spintronic devices occurred pursuant to the seminal discoveries of Ohno ((a) Ohno et al., *Appl. Phys. Lett.*, 69, 363-365 (1996); (b) Ohno, *Science*, 281, 951-956 (1998)) and Awschalom (Kikkawa et al., *Science*, 277, 1284-1287 (1997)) and coworkers which demonstrated ferromagnetic Curie temperatures ($T_c$) in excess of 100K in (Ga, Mn)As, a diluted magnetic semiconductor, and spin coherence times greater than nanoseconds in a variety of technologically important semiconductors. Bulk metallic magnets derived from doping of the narrow-gap insulator FeSi with Co have exhibited GMR and high anomalous Hall conductance similar to that of (Ga,Mn)As (Manyala et al., *Nature Materials*, 3, 255-262 (2004)). The $Fe_{0.9}Co_{0.1}Si$ was found to be nine times more resistive than $Fe_{0.1}Mn_{0.9}Si$ and nearly 20 times more resistive than MnSi. Thus, various silicides such as $Fe_{0.9}Co_{0.1}Si$ and $Fe_{0.1}Mn_{0.9}Si$, etc. promise to be exciting materials with magnetic and semiconducting properties.

Most of these silicides have been made by doping of known semiconductors (Manyala et al., *Nature Materials*, 3, 255-262 (2004)), by heavy ion irradiation of layered materials (Srivastava et al., *J. Phys. D. Appl. Phys.*, 39, 1465-1471

(2006)) or by high pressure synthetic methods ((a) Kimura et al., *Mat. Res. Soc. Symp. Proc.*, 646, N5.38.1-N5.38.6 (2001); (b) Ono, *Photon Factory Activity Report*, #23 Part B, 188 (2006)).

SUMMARY OF THE INVENTION

The invention comprises a ceramic made by a method comprising: providing a composition comprising one or more compounds having the formula in Eq. (1) and one or more metallic components, and pyrolyzing the composition. Each R is an independently selected organic group. The value n is a positive integer. Q is an acetylenic repeat unit comprising one or more of acetylene group, crosslinked acetylene group, $(ML_x)_y$-acetylene complex, and crosslinked $(ML_x)_y$-acetylene complex. M is an independently selected metal. Each L is an independently selected ligand. The values x and y are positive integers. The metallic component is the $(ML_x)_y$-acetylene complex in the compound or a metallic compound capable of reacting with the acetylenic repeat unit to form the $(ML_x)_y$-acetylene complex. The ceramic comprises metallic nanoparticles.

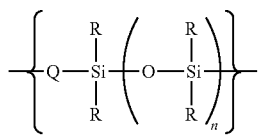
(1)

The invention also comprises the above method.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
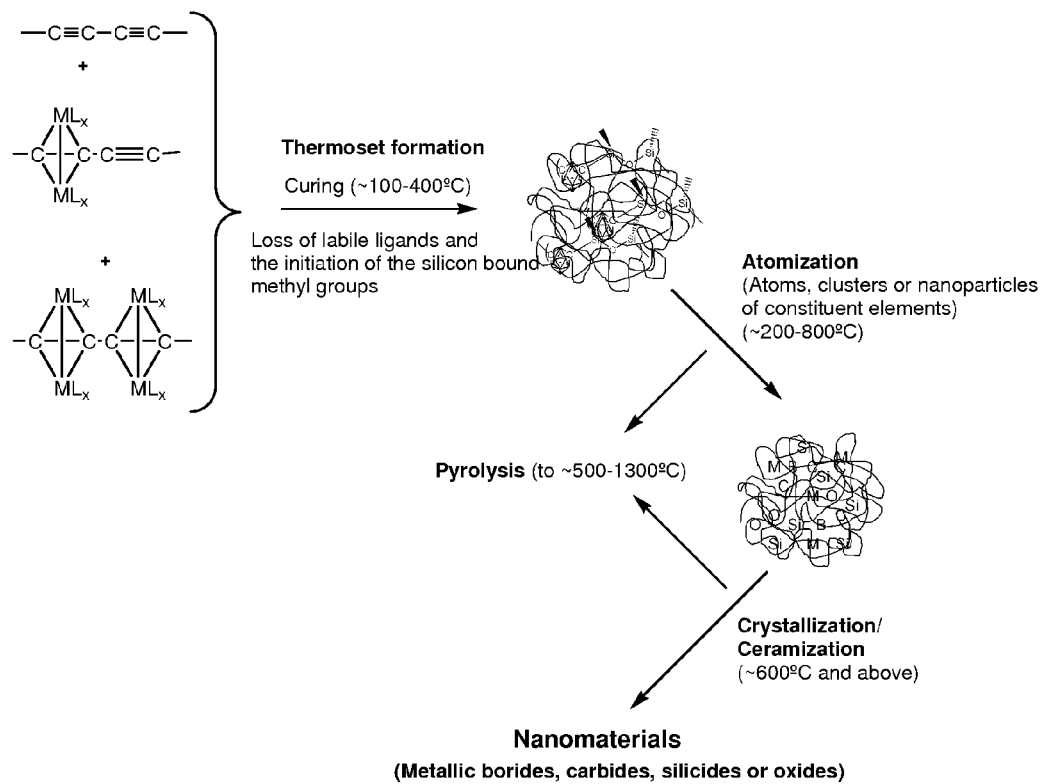
FIG. 1 schematically illustrates some of the processes that can occur when making the ceramic.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Described herein is an ambient pressure pyrolytic synthetic procedure for the production of magnetic semiconductors such as $Fe_{0.9}Co_{0.1}Si$ and $Fe_{0.1}Mn_{0.9}Si$, etc. from diacetylene containing siloxane polymers. The same polymers are observed to yield fcc and bcc phases of iron when the thermodynamics of the pyrolytic transformation is varied by a control of the supplied thermal energy. This method may also use an ambient pressure pyrolytic procedure for the production of fcc and bcc phases of iron in varying concentrations from Fe-derived diacetylene-containing siloxane polymers. The amounts of the fcc and bcc phases of iron that are produced depend on the thermodynamics of the pyrolytic transformation which can again be varied by a control of the supplied thermal energy. Some of the pyrolytic transformations are also found to concomitantly produce carbon nanotubes and SiC as byproducts.

For example, a transition metal may be incorporated in a diacetylene-containing siloxane polymer, such as 1, (Eq. (3)) as a part of a pendant group to its backbone via the reaction of a reactive transition metal-containing moiety with the diacetylene group. The latter reaction which is facilitated by the displacement of labile ligands such as L of the reactive transition metal-containing moiety will yield a statistical mixture of products with unreacted and partially and completely reacted diacetylene ligands (Eq. (4)). During the subsequent thermal treatment, the unreacted diacetylene groups in each of them can aid initially in the formation of crosslinks leading to thermosets at lower temperatures (250-400° C.) which can then be further converted into ceramics upon heating to temperatures above 800° C. The nature and composition of the ceramic products will depend markedly on the degree and rate of thermal treatment and on the environment (such as nitrogen, argon, air, etc.) under which the treatment is performed.

Some embodiments may allow for an organometallic pyrolysis route with mild processing conditions for the production of nanomaterials of carbides and silicides of transition metals and main group metals on their reactions with a group of inorganic-organic hybrid oligomers of siloxanes. The resulting nanomaterials may be magnetic, semiconducting, or superconducting in nature. The process may produce nanomaterials with tunable properties and desired sizes by the manipulation of the processing temperature and the rate of thermal treatment of the metal-derived products of siloxanes or carboranylenesiloxanes. The conducting property of the nanomaterial derived from a particular metal-derived siloxane (as to whether it is semiconducting or superconducting) may depend in part on the choice of the pyrolysis temperature. In addition, the resulting nanomaterials may also possess catalytic properties. The size and surface characteristics of the catalytic nanoparticles may depend in part on the processing temperature and the rate of thermal treatment of the precursor thermoset. The identity and property of the derived products may be tailored by judicious placement of the reactant groups in the polymers.

The incorporation of transition metals into a polymer structure may be used to prepare materials with different properties from conventional carbon-based polymers. In general, the rich diversity of coordination numbers and geometries available for transition elements offer the possibility of accessing polymers with unusual conformational, mechanical, and morphological characteristics. The incorporation of transition metals into polymers may be useful in the production of nanomaterials of transition metals if the polymers are thermally and thermo-oxidatively stable materials. In such polymers, their derivatives with transition metals in the main chain structure (either in the backbone or on the chain) may provide access to processable, specialty materials with similarly attractive physical properties of interest as pyrolytic precursors to metal containing polymers and ceramics.

Metal species may be incorporated in the polymer backbone of diacetylene-containing carboranylenesiloxanes (Houser et al., "Linear Ferrocenylene-Siloxyl-Diacetylene Polymers and Their Conversion to Ceramics with High Thermal and Oxidative Stabilities," Macromolecules, 31(12), 4038 (1998); Keller et al., U.S. Pat. No. 5,844,052). The constituent diacetylene unit, in addition to forming extended networks upon crosslinking, can function as a vehicle for metal incorporation prior to cross-linking as it can form adducts with various metal species. For example, alkynes in general can add across the metal-metal triple bond in $Cp_2Mo_2(CO)_6$ to form adducts of the type $Cp_2Mo_2(CO)_6(\mu-\eta^2:\eta^2-R-C\equiv C-R)$ with a tetrahedral $C_2Mo_2$ core (Eq. (2)) (Klinger et al., "Synthesis, reactivity, and molecular structure of cyclopentadienylmolybdenum dicarbonyl dimer. Molybdenum-molybdenum triple bond," J. Am. Chem. Soc., 97(12), 3535 (1975)). In fact, under photochemical conditions, some metal complexes are even known to function as catalysts for the crosslinking of acetylenes (Masuda et al., "Polymerization of phenylacetylene induced by UV. Irradiation of group 6 transition metal carbonyls," Polymer, 23(11), 1663 (1982)).

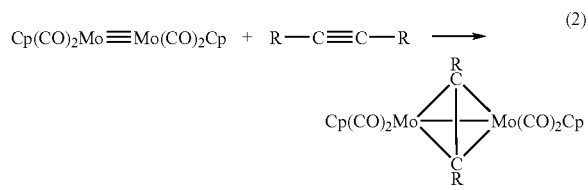

(2)

The ceramic is made from a class of compounds being polymers or thermosets comprising acetylenic repeat units and siloxane. The acetylenic repeat unit may be crosslinked and still be referred to as an acetylenic repeat unit. Polycarbosiloxane crosslinks may also be present. Such acetylene and polycarbosiloxane crosslinks are described by Corriu et al., "Organosilicon Polymers: Pyrolysis Chemistry of Poly [(dimethylsilylene)diacetylene]," Organometallics, 11(7), 2507 (1992). Polycarbosiloxane crosslinks may be found, among other possibilities, when all the acetylene groups are complexed by using an excess of metallic compound.

Such siloxane polymers and methods of making them are disclosed in U.S. Pat. Nos. 5,272,237; 5,292,779; 5,348,917; 5,483,017; 5,552,505; 5,563,181; 5,679,818; 5,681,870; 5,756,629; 5,780,569; 5,807,953; 5,844,052; 5,874,514; 5,932,335; 5,969,072; 5,981,678; 5,986,032; 6,025,453; 6,187,703; 6,225,247; 6,265,336; 6,362,289; 6,495,483; 6,579,955; 6,767,981; 6,770,583; 6,784,259; 6,784,270; 6,787,615; 6,967,233; 7,153,921; and 7,238,766 to Keller et al. Generally, such polymers may be made, among other methods, by reacting halogen-terminated units with hydroxyl-terminated units or metal-terminated units, including lithium-terminated units.

Derivatives of the siloxane polymer may also be used in addition to or instead of the siloxane polymer. A metallized polymer contains at least one $(ML_x)_y$-acetylene complex in the backbone and may be made by reaction of the siloxane polymer with a suitable metallic compound. THF may be used as a solvent for this reaction to facilitate the displacement of, for example, the carbonyl ligands. In most solvents, the predominant isomer is trans. In solvents such as DMSO, THF, DMF, hexanes, or mixtures of them, the ratio can be reversed. Between the trans and gauche isomers, the carbonyl exchange or displacement with the lowest energy dynamics is observed in gauche-$Cp_2Mo_2(CO)_6$. Thermosets made by crosslinking the siloxane polymer or the metallized polymer may also be used.

The acetylenic repeat unit comprises one or more acetylene groups, any of which may be $(ML_x)_y$-acetylene complex. In some embodiments, the acetylenic repeat unit is based on diacetylene. Such a repeat unit consists of two groups independently selected from acetylene and $(ML_x)_y$-acetylene complex.

Suitable metals for the M in the complex or metallic compound include, but are not limited to, main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

Suitable ligands (L group) for the complex or metallic compound include, but are not limited to, carbonyl, cyclopentadienyl, pentamethylcyclopentadienyl, trimethylsilylcyclopentadienyl, hexafluoroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

Suitable values for x include, but are not limited to, 1 to 16 or 1 to 12. Suitable values for y include, but are not limited to, 1 to 6 or 1 to 4. Suitable metallic compounds (including metal salts) include, but are not limited to, $V(CO)_6$, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Fe_2(CO)_9$, $Fe_3(CO)_{12}$, $Ru(CO)_5$, $Ru_3(CO)_{12}$, $Os(CO)_5$, $Os_3(CO)_{12}$, $Co_2(CO)_8$, $Co_3(CO)_{12}$, $Co_6(CO)_{16}$, $Rh_4(CO)_{12}$, $Rh_6(CO)_{16}$, $Ir_4(CO)_{12}$, $Ir_6(CO)_{16}$, $Ni(CO)_4$, $Cp(CH_3)_5Re(CO)_3$, $Cp(CH_3)_5Re(CO)_3$, $[Cp(CH_3)_5]_2Cr_2(CO)_4$, $Cp_2Fe_2(CO)_4$, $C_6H_8Fe(CO)_3$, $C_6H_8Fe(CO)_3$, $C_8H_8Fe(CO)_3$, $CpCr(CO)_3$, $Cp_2Mo_2(CO)_6$, $C_7H_8Mo(CO)_3$, $CpMn(CO)_3$, $Cp(Si(CH_3)_3)Mn(CO)_3$, $Cp(CH_3)_5Rh(CO)_2$, $Cp_2Ru_2(CO)_4$, (hexafluoroacetylacetonate)Cu(cyclooctadiene), Cr(hexafluoroacetylacetonate), Co(acetylacetonate) $(CH_3CN)_4Cu$(hexafluroacetylacetonate), $(CH_3)_2Au$(acetylacetonate), (cyclooctadiene)Ir(acetylacetonate), Fe(acetylacetonate), Mn(acetylacetonate), $MoO_2$(acetylacetonate)$_2$, Ni(hexafluoroacetylacetonate), Ni(cyclooctadiene)$_2$, Ni(SCN)$_2$, PdCl$_2$(CH$_3$CN)$_2$, Pd(NH$_3$)$_2$(NO$_2$)$_2$, Pt(NH$_3$)$_2$Cl$_2$, Rh(cyclooctadiene)$_2$(SO$_3$CF$_3$), Rh(cyclooctadiene)Cl$_2$, Zr(trifluoroacetylacetonate), MgCl$_2$, SmCl$_2$, and AlCl$_2$.

When the composition comprises siloxane polymer and/or siloxane thermoset without any metallized polymer or metallized thermoset, then the composition may also comprise a metallic compound capable of reacting with the acetylenic repeat unit to form a (ML$_x$)$_y$-acetylene complex. This allows for the formation of (ML$_x$)$_y$-acetylene complex during the heating process, though such formation is not required. Such a compound may also be in the composition when metallized polymer or thermoset is present. The ceramic may also comprise carbon nanotubes formed in situ during the heating.

The ceramic contains metallic nanoparticles formed during the pyrolysis. Such nanoparticles may include, but are not limited to, bcc Fe, fcc Fe, Fe$_{1-z}$Co$_z$Si, Fe$_{1-z}$Mn$_z$Si, Mn$_5$Si$_3$, Fe$_7$C$_3$, and Fe$_{1-z}$Co$_z$. As used herein "metallic nanoparticles" may be either pure metal or contain metal and nonmetallic elements such as silicon.

Several processes may occur as the composition is heated and pyrolyzed, as schematically illustrated in FIG. 1. Polymers may crosslink to thermosets. Acetylene crosslinking may be catalyzed by metal components, including decomposed metal salts. Metal complexes may form with the acetylene groups. Metal complexes may decompose to release free metal atoms, which can then agglomerate into metal clusters and/or metal nanoparticles. Such clusters and nanoparticles include both pure metal and metal compounds such as Mo$_2$C. After such decomposition, the decomplexed acetylene may crosslink. Metallic repeat units may decompose from the backbone and also form organometallic units, free metal atoms, metal clusters, and/or metal nanoparticles. Polycarbosiloxane crosslinking can occur. The composition as a whole can char to form a ceramic, producing metallic carbides, silicides, borides, oxides, and a variety of other metal compounds. Whether a metal-carbide or -silicide was formed, may be at least partly determined by the proximity of the respective reactant atoms in the metal derived polymer and the enthalpies and entropies of formation of the possible products. During the charring process, ligands may be removed and vaporized, such as carbonyl groups. Carbon nanotubes may also be formed.

The reaction of a siloxane polymer or thermoset with a metal carbonyl or a neutral metal complex with labile ligands can be carried out at various ratios of the siloxane and metallic compound. The ratio can be chosen so as to retain a desired fraction of the starting inorganic-organic hybrid polymer in its unreacted and partially reacted forms in the product mixture (Eq. (4)). Such a retention is achieved to provide unreacted and partially reacted diacetylene units in the product mixture for utilization in thermoset formation by their crosslinking reactions. The reactant ratios at least partly dictate the ratio of the product components.

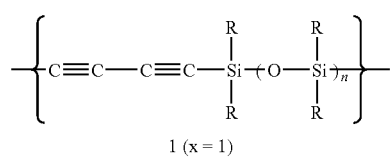

(3)

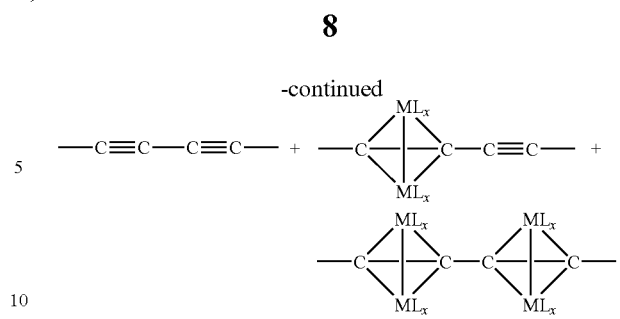

As used herein, a molar ratio of polymer to metal compound refers to the ratio of the acetylenic repeat unit (such as a diacetylene repeat unit) to metal compound. In a reaction using the siloxane polymer shown in Eq. (3) (1) performed at an equimolar ratio of acetylenic repeat units and Cp$_2$Mo$_2$(CO)$_6$, three products of the form in Eq. (4) can be formed in various amounts depending on the reaction kinetics. The evidence of the reaction and its progress may be provided by FTIR spectroscopy. The equimolar reaction of Cp$_2$Mo$_2$(CO)$_6$ with 1 in refluxing THF results in the displacement of two of the carbonyl ligands by the diacetylene, yielding the transient, reactive triply-bonded Cp$_2$Mo$_2$(CO)$_6$ and subsequently, a π-bonded complex. As the reaction progresses, the initial IR absorptions of Cp$_2$Mo$_2$(CO)$_6$ (1960 and 1915 cm$^{-1}$) (FIG. 2(*a*)) are replaced by new IR absorptions at 1950, 1923, 1900 and 1891 cm$^{-1}$ of the diacetylene-bound Cp$_2$Mo$_2$(CO)$_6$ moieties (FIG. 2(*b*)). The presence of an unchanged diacetylene absorption at 2070 cm$^{-1}$ in the FTIR spectrum of the final product suggests that a fraction of the starting material remains unreacted as expected. Since the reaction is quantitative in yield, this implies that the starting reactant Cp$_2$Mo$_2$(CO)$_6$ has to be distributed among the reacted fraction of the siloxane polymer yielding either a mono or a bis π-coordinated η$^5$-cyclopentadienyltetracarbonyl-dimolybdenum complex. Such a formation of π-complexes has been reported in the reaction involving Cp$_2$Mo$_2$(CO)$_6$ and the conjugated enediyne, E-1,6-bis(trimethylsilyl)hexa-1,5-diyn-3-ene (Lindsell et al., "Synthesis and characterization of cobalt and molybdenum complexes derived from linear conjugated diynenes, triynedienes and tetraynetrienes," *J. Organomet. Chem.*, 439(2), 201 (1992). Further evidence for the retention of a fraction of the siloxane polymer in its unreacted form is obtained from the product's $^{13}$C NMR spectrum in CDCl$_3$. In the $^{13}$C NMR spectrum, the NMR resonances of the diacetylene carbons (C1 and C2 in Eq (5)) of the siloxane at δ87.05 and 84.81 are still evident indicating the presence of some unreacted siloxane polymer. In addition, the resonances for the carbons of the diacetylene units in the mono- and bis-Cp$_2$Mo$_2$(CO)$_6$ derivatives are observed at δ132.46 (C4), 130.86 (C8), 128.79 (C5), 111.22 (C3), and 92.29 (C6 and C7). Unique resonances are also observed for the cyclopentadienyl groups (δ95.72 (PR); δ91.99 (CR)) and the carbonyl ligands (δ241.5 (PR), 234.1 (PR), 229.8 (PR); 226.5 (CR), 223.9 (CR)) of the π-coordinated mono- and bis-Cp$_2$Mo$_2$(CO)$_6$ complexes. The observed $^{13}$C resonances are well in agreement with similar reported values for the π-coordinated mono- and bis-Cp$_2$Mo$_2$(CO)$_6$ complexes formed from the reaction between Cp$_2$Mo$_2$(CO)$_6$ and the conjugated enediyne, E-1,6-bis(trimethylsilyl)hexa-1,5-diyn-3-ene (Lindsell, Id.). Together, the FTIR and FTNMR spectroscopic studies of the reaction product confirmed that free diacetylene units and acetylene fragments are available in the product for its conversion into a network system by thermal crosslinking.

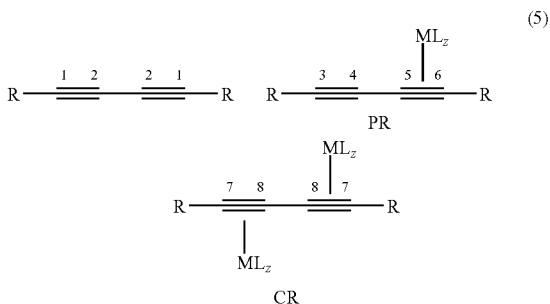

(5)

CR

The crosslinking or curing of the polymer/thermoset/metallic component composition may be achieved by the thermal treatment of the product to, for example, about 400° C. in two steps of various durations. On crosslinking, the strands of the oligomers with the partially or completely functionalized diacetylene units may be bound within a tightly crosslinked network system formed by the thermal polymerization of the diacetylene units (in unreacted polymer) and the acetylene fragments (in partially reacted PR). A tightly crosslinked network may enhance the entrapment of the reactant moieties in closer proximity during the initial stage of the pyrolysis thereby facilitating product formation.

Figure 3:
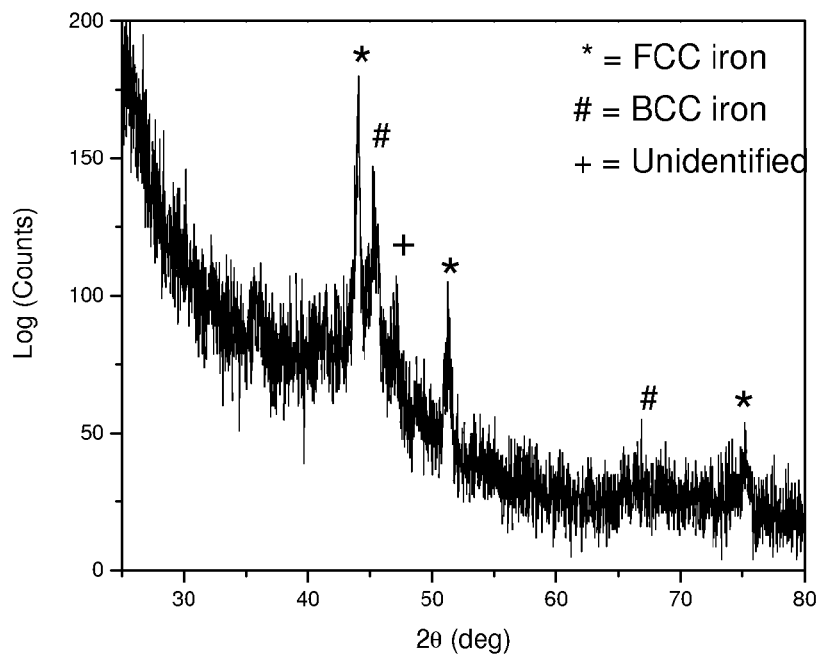
FIG. 3 shows an X-ray diffraction spectrum of the residue on pyrolysis of the product from Example 2 to 1000° C. in argon.

The pyrolysis of the crosslinked network may be achieved by the thermal treatment of the network to an elevated temperature, for example about 1000° C., which may result in the conversion of the matrix to the eventual products. Weight losses during the initial curing and the subsequent pyrolysis of the crosslinked network formed from the adduct of 1 and $Cp_2Mo_2(CO)_6$, were 33% and 11%, respectively. These losses corresponded roughly to the elimination of the labile carbonyl and cyclopentadienyl ligands during the initial curing process and the subsequent expulsion of the silicon-bound methyl groups during the later stages of the curing process and during pyrolysis. The deletion of carbonyls and cyclopentadienyl rings from organometallics has been known to occur at temperatures below 300° C. (Hor et al., "Substituted Metal-Carbonyls Part. XVII. Thermal Decarbonylation and Chelation of $M(CO)_5(\eta\text{-dppf})$ and $Fe(CO)_4(\eta\text{-dppf})$ [where M=Cr, Mo, W; dppf=$(Ph_2PC_5H_4)_2Fe$]," *Thermochimica Acta*, 178, 287 (1991)). The loss of methyl groups from siloxyl units have been reported to occur in the 450-550° C. temperature range (Corriu et al., "Pyrolysis of poly[(silylene)diacetylenes]: direct evidence between their morphology and thermal behavior," *J. Organomet. Chem.*, 449(1-2), 111 (1993)). The evidence for the respective losses of ligands from the crosslinked network can be obtained from a TGA-DTA thermogram of the network by thermally treating it to 1000° C. at 10° C./min. As seen in FIG. 3, the differential curve in the thermogram exhibits two sharper peaks (transitions) around 222° C. and 267° C. and a broader peak centering at 525° C. The sharper peaks represent the successive removal of the carbonyl and the cyclopentadienyl ligands within a narrow temperature range and the latter broad peak originates from the removal of the silicon-bound methyl groups over a large temperature range. Further evidence for the respective removal of the ligands during the crosslinking of the reaction product between 1 and $Cp_2Mo_2(CO)_6$ can also obtained from the solid state FTIR spectra (in KBr pellets) of crosslinked samples obtained by the thermal treatment of the reaction product at 300° C. (for one hour) and 550° C. (for two hours), respectively. In the FTIR spectrum of the former, the IR absorptions of the carbonyls (1950, 1923, 1900, and 1891 cm$^{-1}$) and that of the cyclopentadienyl ligands (3114 cm$^{-1}$) in the reaction product were found to be absent, while in the latter's FTIR spectrum in addition to the carbonyl and cyclopentadienyl absorptions, the absorptions for the silicon-bound methyl groups (1257, 822 cm$^{-1}$, etc.) were also absent. The organometallic derivatives of the inorganic-organic hybrid polymers of this invention essentially may rely on this initial availability of unreacted diacetylene units and the subsequent thermal curing of these units to produce tight crosslinked networks to facilitate their eventual conversion into transition metal nanomaterials by pyrolytic reactions.

Similar reactions of 1 at desired ratios (for example, 3:1, 1:5, etc.) with a particular metal carbonyl or a labile ligand-containing neutral metal complex can yield differing amounts of the unreacted, partially reacted and completely reacted polymers of 1.

The precursors and thermosets of the metal adducts of the diacetylene containing poly(siloxanes) and poly(carboranylenesiloxanes) upon thermal treatment above 500° C. can produce several magnetic, semiconducting, and superconducting nanomaterials with tunable properties and desired sizes by the simple manipulation of the processing temperature of the metal-derived products of the inorganic-organic hybrid polymers (linear and network). At a certain temperature, the metallic component of the precursor can commence to decompose in the polymer or the thermoset, resulting in the formation of metal nanoparticles within the networked system. This happens as the temperature of the composition is increased causing the solidification of the sample and the subsequent decomposition of the metallocyclic compound resulting in the formation of initially metal atoms followed by metal clusters and/or metal nanoparticles within the polymeric composition (atomization). The metal species (atoms, clusters, and nanoparticles) can be encapsulated and protected against oxidation by the developing polymeric/ceramic domain. Further heat treatment of the networked or thermosetting system containing the decomposed metal precursor can result in the formation of nanomaterials such as the carbides and suicides of transition metals, main group metals, lanthanides, and actinides (crystallization/ceramization).

The size and concentration of the metal species may be readily controlled by the amounts of metal component present in the thermoset derived from the metal adduct of the polymer. For example, as the molar concentration of metal component relative to the polymer is increased, metal nanoparticles within the polymer can become strongly coupled giving rise to physical properties in the developing ceramic material resulting from the formation of magnetic nanodomains. The nature of the product derived from a reactive metal species and the concerned inorganic-organic hybrid polymers may be at least partly determined by the fashion in which the metal is incorporated into the polymeric system as a pendant group.

The conducting property of the nanomaterial derived from a particular metal-derived inorganic-organic hybrid polymer as to whether it is semiconducting, conducting, or superconducting may depend on the choice of the pyrolysis temperature and the crystalline lattice produced. The size and nature of the nanoparticles can further be tailored by the selective treatment of the materials at chosen temperatures.

The thermal treatment or pyrolysis can be carried out either in an inert (argon, $N_2$) atmosphere or in air. Even though, the metal species (atoms, clusters, and nanoparticles) are encapsulated and protected against oxidation by the developing polymeric/ceramic domain, the nature of the pyrolysis environment can have an effect on the nature of the nanomaterials that are produced. For example, in an environment of $N_2$, metal units such as Ti, Zr, Hf, V, Nb, Mo, etc. have the opportunity to form their nitrides at temperatures above 1100° C. Thus, the identity and nature of the nanomaterials that are produced can depend upon the reactant ratio of the metal complex and the polymer, the site of spatial incorporation of the metal unit in the polymer, the rate of temperature treatment and the final pyrolysis temperature, and the atmosphere under which the pyrolysis is conducted.

Having described the invention, the following examples are given to illustrate specific applications of the invention. These specific examples are not intended to limit the scope of the invention described in this application.

Instrumentation—Thermogravimetric analyses (TGA) were performed on a SDT 2960 DTA-TGA analyzer under a nitrogen flow rate of 100 cc/min. The heating rate was 1° C./min, 2° C./min or 10° C./min and the cooling rate was 5° C./min. X-ray analyses were performed using a Rigaku 18 kW X-ray generator and a high-resolution powder diffractometer. X-ray diffraction scans of the samples were measured using Cu Kα-radiation from a rotating anode X-ray source. The temperature dependent dc resistivity measurements were carried out using a standard four probe configuration with the sample slowly lowered into a liquid helium dewar. The value of the resistivity was estimated assuming that the sample was homogeneous and dense and thus should not be taken to be the true bulk value. For TEM analysis, nano-powder was added to ethyl alcohol and the mixture was placed in an ultrasonic cleaner for 5 minutes. A carbon coated 200 mesh copper grid was immersed in the mixture to pick up the nano-powder samples. The specimen was examined in a Philips CM30 microscope operated at 300 kV. The differential scanning calorimetry (DSC) studies were performed on a DSC 2920 modulated DSC instrument and carried out with heating rates of 10° C./min and a nitrogen flow rate of 100 cc/min. Infrared (IR) spectra were obtained on a Nicolet Magna 750 Fourier transform infrared spectrometer. Solution-state $^{13}$C NMR spectra were acquired on a Bruker AC-300 spectrometer and referenced to the internal solvent peak (chloroform-d, or CDCl$_3$).

Example 1

Synthesis of poly(siloxane-diacetylene), 1—THF (3.5 mL) and n-butyllithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h. After this period, the reaction flask was cooled again to −78° C. and 0.39 mL of 1,3-dichlorotetramethyldisiloxane (1.975 mmol) was added drop wise. The ice bath was removed and the reaction was allowed to proceed overnight. After this period, a few extra drops of the siloxane reagent were added to the mixture and the reaction was continued for two more hours. The mixture was then poured into an aqueous saturated NH$_4$Cl solution (30 mL). The aqueous mixture was extracted with Et$_2$O (3×20 mL). The ether extracts were then combined, dried over Na$_2$SO$_4$, and the dried extracts were filtered through celite. The filtered extracts were subjected to vacuum to remove the ether, which resulted in an oily brown product (1.9 g, 100%). IR (KBr, cm$^{-1}$): 2959 ($\nu_{C-H}$ Si—CH$_3$), 2921 ($\nu_{C-H}$ Si—CH$_3$), 2071 ($\nu_{C-C}$), 1409 ($\nu_{-CH2\ bend}$), 1264 ($\nu_{Si-C}$), 1059 ($\nu_{Si-O}$), 801 ($\nu_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$). $^{13}$C {$^1$H} NMR (CDCl$_3$, ppm): 0.26 (Si—CH$_3$), 0.52 (Si—CH$_3$), 1.00 (Si—CH$_3$), 1.79 (Si—CH$_3$), 86.8 (—C—C), and 84.2 (—C—C).

Example 2

Functionalization of 1 with Fe$_2$(CO)$_9$, the 1:1 reaction—0.25 g of 1 (M.W.=180.37 g/mol; 0.139 mmol) and 0.504 g of Fe$_2$(CO)$_9$ (M.W.=363.79 g/mol; 0.139 mmol) were transferred to a flame-dried 50 mL flask under argon. The mixture was dissolved in 10 mL of THF and was stirred at room temperature for 1 hour and subsequently refluxed for 15 h. The FT-IR spectrum (on NaCl plate) of the product from an aliquot of the reaction mixture during the 1$^{st}$ hour of stirring exhibited carbonyl absorptions at 2031, 1987 and 1719 cm$^{-1}$. After reflux, THF was removed from the product under vacuum to yield a maroon-colored precipitate (0.6 g, 99%). The FT-IR spectrum of the product exhibited carbonyl absorptions at 2027, 1990 and 1722 cm$^{-1}$. IR (KBr, cm$^{-1}$): 2959 ($\nu_{C-H}$ Si—CH$_3$), 2921 ($\nu_{C-H}$ Si—CH$_3$), 2071 ($\nu_{C-C}$), 2027 ($\nu_{C-O}$), 1990 ($\nu_{C-O}$) and 1722 ($\nu_{C-O}$), 1409 ($\nu_{-CH2\ bend}$), 1264 ($\nu_{Si-C}$), 1059 ($\nu_{Si-O}$), 801 ($\nu_{Si-C\ bend}$).

Example 3

Functionalization of 1 with Fe$_2$(CO)$_9$, the 2:1 reaction—0.25 g of 1 (M.W.=180.37 g/mol; 0.139 mmol) and 0.252 g of Fe$_2$(CO)$_9$ (M.W.=363.79 g/mol; 0.070 mmol) were transferred to a flame-dried 50 mL flask under argon. The mixture was dissolved in 10 mL of THF and was stirred at room temperature for 1 hour and subsequently refluxed for 15 h. The FT-IR spectrum (on NaCl plate) of the product from an aliquot of the reaction mixture during the 1$^{st}$ hour of stirring exhibited carbonyl absorptions at 2032, 1987 and 1722 cm$^{-1}$. After reflux, THF was removed from the product under vacuum to yield a maroon-colored precipitate (0.42 g, 99%). The FT-IR spectrum of the product exhibited carbonyl absorptions at 2028, 1988 and 1724 cm$^{-1}$. IR (KBr, cm$^{-1}$): 2959 ($\nu_{C-H}$Si—CH$_3$), 2921 ($\nu_{C-H}$Si—CH$_3$), 2071 ($\nu_{C-C}$), 2028 ($\nu_{C-O}$), 1988 ($\nu_{C-O}$) and 1724 ($\nu_{C-O}$), 1409 ($\nu_{-CH2\ bend}$), 1264 ($\nu_{Si-C}$), 1059 ($\nu_{Si-O}$), 801 ($\nu_{Si-C\ bend}$).

Example 4

Figure 2:
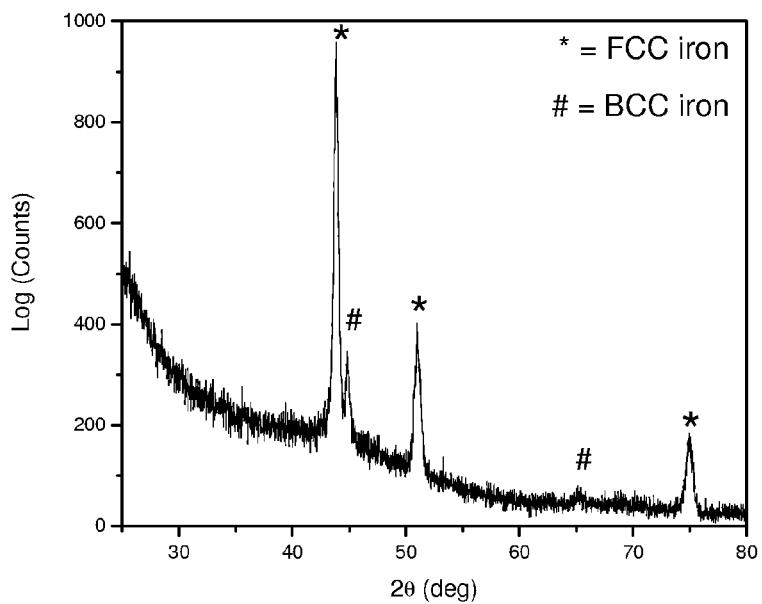
FIG. 2 shows an X-ray diffraction spectrum of the residue on pyrolysis of the product from Example 2 to 1000° C. in nitrogen.

Pyrolysis to 1000° C. of the product from Example 2 under nitrogen—A portion (50 mg) of the product mixture was placed in a ceramic crucible in a TGA instrument and was thermally treated to 1000° C. at 10° C./min under nitrogen, after which it was cooled to ambient temperature in the TGA instrument. A shaped ceramic sample resulted from the thermal treatment, which was analyzed by X-ray diffraction spectroscopy (FIG. 2). The product was found to contain mainly nanoparticles of the fcc phase of iron along with a small amount of nanoparticles of the bcc phase of iron.

Example 5

Pyrolysis to 1000° C. of the product from Example 2 under argon—A portion (40 mg) of the product mixture was placed in a ceramic crucible in a TGA instrument and was thermally treated to 1000° C. at 10° C./min under argon, after which it was cooled to ambient temperature in the TGA instrument. A shaped ceramic sample resulted from the thermal treatment, which was analyzed by X-ray diffraction spectroscopy (FIG. 3). The product was found to contain nanoparticles of the fcc and bcc phases of iron along with a small amount of SiC and some unidentified component/s.

Example 6

Figure 4:
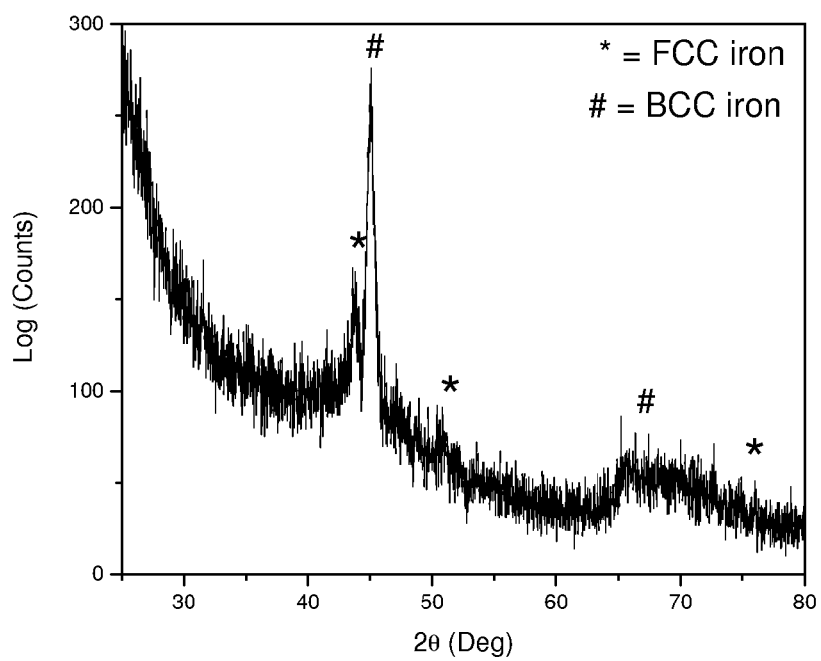
FIG. 4 shows an X-ray diffraction spectrum of the residue of the product from Example 3 on pyrolysis to 1000° C. in nitrogen.

Pyrolysis to 1000° C. of the product from Example 3 under nitrogen—A portion (54 mg) of the product mixture was placed in a ceramic crucible in a TGA instrument and was thermally treated to 1000° C. at 10° C./min under nitrogen, after which it was cooled to ambient temperature in the TGA instrument. A shaped ceramic sample resulted from the thermal treatment, which was analyzed by X-ray diffraction spectroscopy (FIG. 4). The product was found to contain mainly nanoparticles of the bcc phase of iron along with a small amount of nanoparticles of the fcc phase of iron.

Example 7

Figure 5:
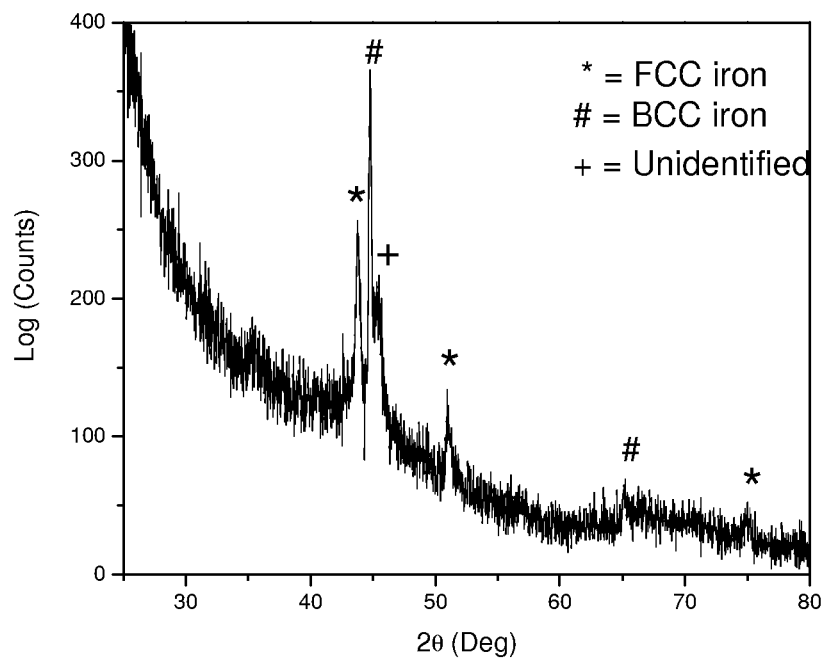
FIG. 5 shows an X-ray diffraction spectrum of the residue of the product from Example 3 on pyrolysis to 1000° C. in argon.

Pyrolysis to 1000° C. of the product from Example 2 under argon—A portion (40 mg) of the product mixture was placed in a ceramic crucible in a TGA instrument and was thermally treated to 1000° C. at 10° C./min under argon, after which it was cooled to ambient temperature in the TGA instrument. A shaped ceramic sample resulted from the thermal treatment, which was analyzed by X-ray diffraction spectroscopy (FIG. 5). The product was found to contain mainly nanoparticles of the bcc phase of iron along with a small amount of nanoparticles of the fcc phase of iron. A small amount of SiC and some unidentified components were also present.

Example 8

Formation of the thermoset of the product from Example 2 (under nitrogen)—A portion (80 mg) of the product mixture was placed in a ceramic crucible in a TGA instrument and was thermally treated under nitrogen as follows. The product was heated to 250° C. at 2° C./min and was held at this temperature for 30 minutes. It was subsequently heated to 400° C. at 2° C./min and was held isothermally at this temperature for 120 minutes. Finally, the product was cooled to room temperature at 2° C./min. A shaped thermoset resulted from the thermal treatment.

Example 9

Figure 6:
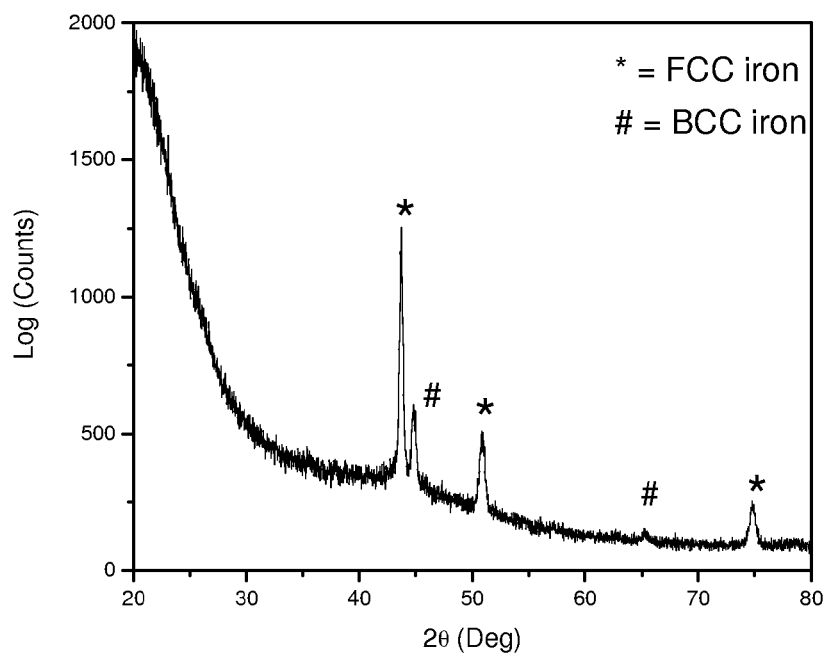
FIG. 6 shows an X-ray diffraction spectrum of the residue on pyrolysis of the product from Example 9 to 1000° C. at a slow rate in nitrogen.

Pyrolysis at a slower rate to 1000° C. of the thermoset from Example 8 under nitrogen—A portion (50 mg) of the product mixture was placed in a ceramic crucible in a TGA instrument and was thermally treated to 1000° C. under nitrogen as follows. The product was heated to 400° C. at 2° C./min and was held at this temperature for 5 minutes. It was subsequently heated to 1000° C. at 1° C./min and was cooled to room temperature at 5° C./min. A shaped ceramic sample resulted from the thermal treatment, which was analyzed by X-ray diffraction spectroscopy (FIG. 6). The product was found to contain mainly nanoparticles of the fcc phase of iron along with some nanoparticles of the bcc phase of iron.

Example 10

Figure 7:
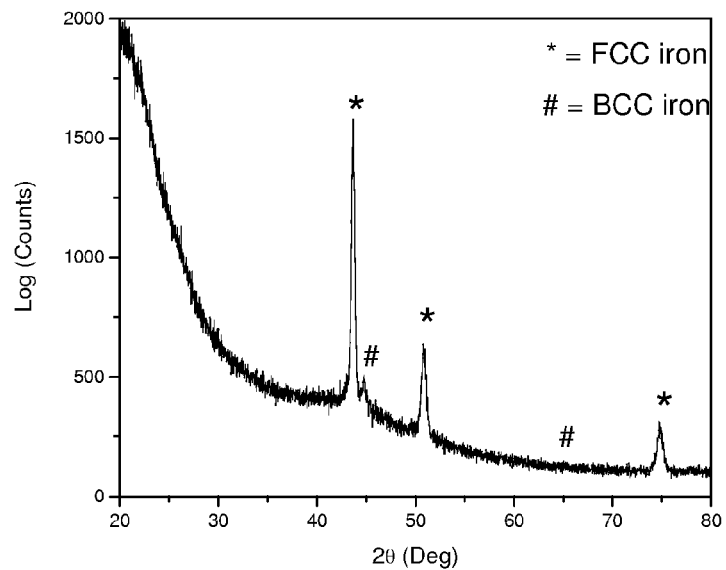
FIG. 7 shows an X-ray diffraction spectrum of the residue on pyrolysis of the product from Example 8 to 1000° C. at a fast rate in nitrogen.
Figure 8:
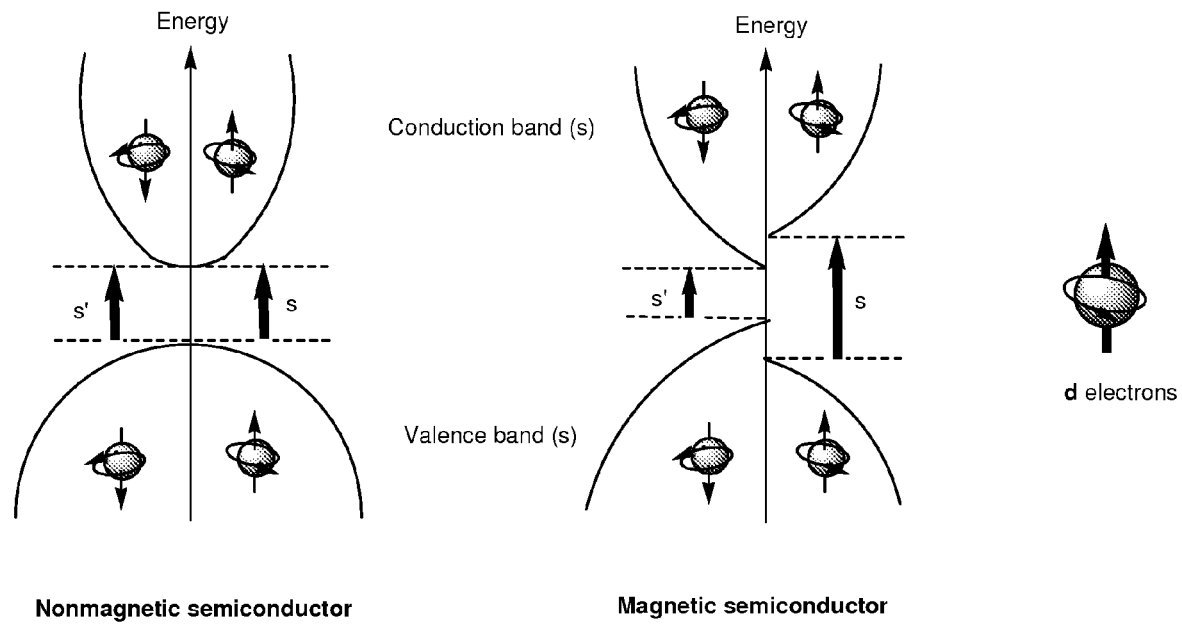
FIG. 8 schematically illustrates bandgaps in nonmagnetic and magnetic semiconductors.

Pyrolysis at a faster rate to 1000° C. of the thermoset from Example 8 under nitrogen—A portion (50 mg) of the product mixture was placed in a ceramic crucible in a TGA instrument and was thermally treated to 1000° C. at 10° C./min and was cooled to room temperature under nitrogen. A shaped ceramic sample resulted from the thermal treatment, which was analyzed by X-ray diffraction spectroscopy (FIG. 7). The product was found to contain mainly nanoparticles of the fcc phase of iron along with a small amount of nanoparticles of the bcc phase of iron.

Example 11

Functionalization of 1 with $Fe_2(CO)_9$ and $Co_2(CO)_8$ at a ratio of 8:1 (polymer:metals(combined)) and Fe:Co ratio of 10:1—0.500 g of 1 (2.77 mmol) was mixed with 0.115 g of $Fe_2(CO)_9$ (0.315 mmol) and 0.012 g of $Co_2(CO)_8$ (0.035 mmol) in a flame-dried 50 mL flask under argon. The mixture was dissolved in 25 mL of THF and was stirred at room temperature for 1 hour and subsequently refluxed for 15 h. After reflux, THF was removed from the product under vacuum to yield product precipitates.

Example 12

Figure 9:
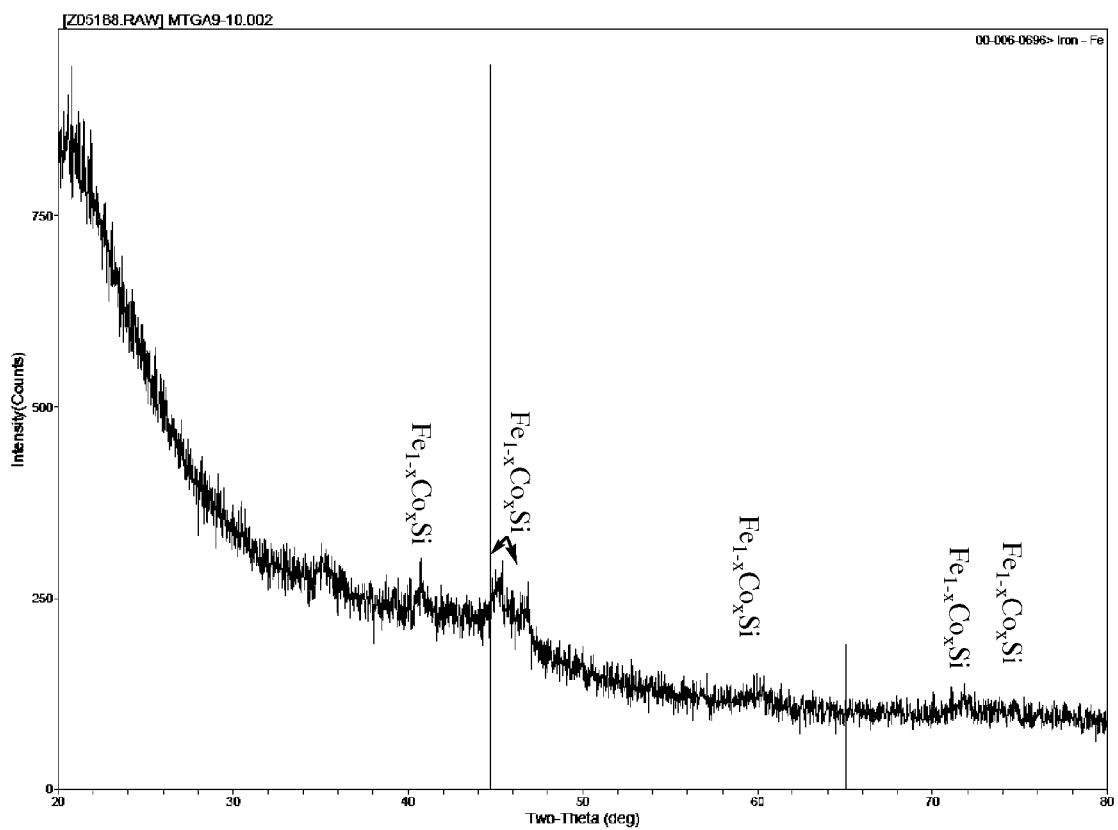
FIG. 9 shows an X-ray diffraction spectrum of the residue on pyrolysis of the product from Example 11 to 1000° C. at a slow rate in nitrogen.

Pyrolysis at a faster rate to 1000° C. of the thermoset from Example 11 under nitrogen—A portion (25 mg) of the product mixture was placed in a ceramic crucible in a TGA instrument and was thermally treated to 1000° C. at 10° C./min and was cooled to room temperature under nitrogen. A shaped ceramic sample resulted from the thermal treatment, which was analyzed by X-ray diffraction spectroscopy (FIG. 9). The product was found to contain mainly nanoparticles of the magnetic semiconductor, $Fe_{1-x}Co_xSi$.

Example 13

Functionalization of 1 with $Fe_2(CO)_9$ and $Co_2(CO)_8$ at a ratio of 8:1 (polymer:metals(combined)) and Fe:Co ratio of 2:1—0.500 g of 1 (2.77 mmol) was mixed with 0.089 g of $Fe_2(CO)_9$ (0.24 mmol) and 0.036 g of $Co_2(CO)_8$ (0.12 mmol) in a flame-dried 50 mL flask under argon. The mixture was dissolved in 25 mL of THF and was stirred at room temperature for 1 hour and subsequently refluxed for 15 h. After reflux, THF was removed from the product under vacuum to yield product precipitates.

Example 14

Figure 10:
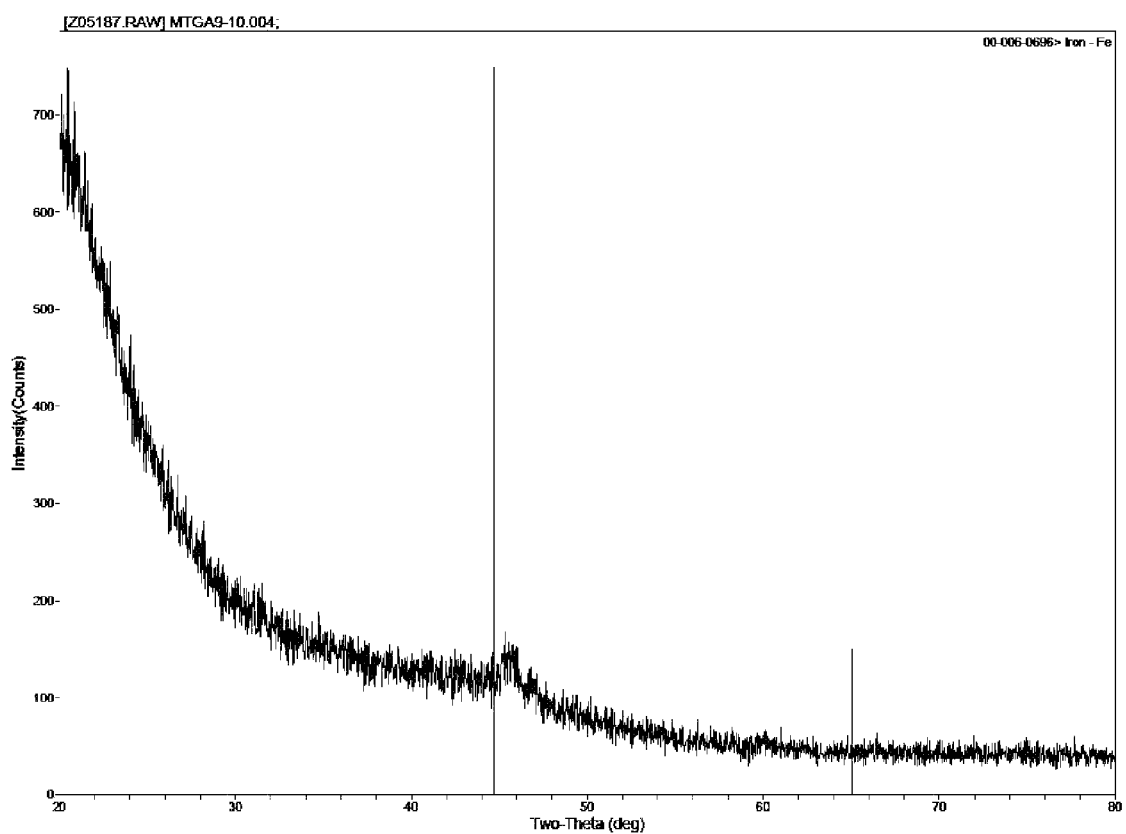
FIG. 10 shows an X-ray diffraction spectrum of the residue on pyrolysis of the product from Example 14 to 1000° C. at a fast rate in nitrogen.

Pyrolysis at a faster rate to 1000° C. of the thermoset from Example 13 under nitrogen—A portion (25 mg) of the product mixture was placed in a ceramic crucible in a TGA instrument and was thermally treated to 1000° C. at 10° C./min and was cooled to room temperature under nitrogen. A shaped ceramic sample resulted from the thermal treatment, which was analyzed by X-ray diffraction spectroscopy (FIG. 10). The product was found to contain both Fe and Co; however, its identity was inconclusive.

Example 15

Functionalization of 1 with $Fe_2(CO)_9$ and $Co_2(CO)_8$ at a ratio of 4:1 (polymer:metals(combined)) and Fe:Co ratio of 2:1.6—0.500 g of 1 (2.77 mmol) was mixed with 0.142 g of $Fe_2(CO)_9$ (0.40 mmol) and 0.105 g of $Co_2(CO)_8$ (0.32 mmol) in a flame-dried 50 mL flask under argon. The mixture was dissolved in 25 mL of THF and was stirred at room temperature for 1 hour and subsequently refluxed for 15 h. After reflux, THF was removed from the product under vacuum to yield product precipitates.

Example 16

Figure 11:
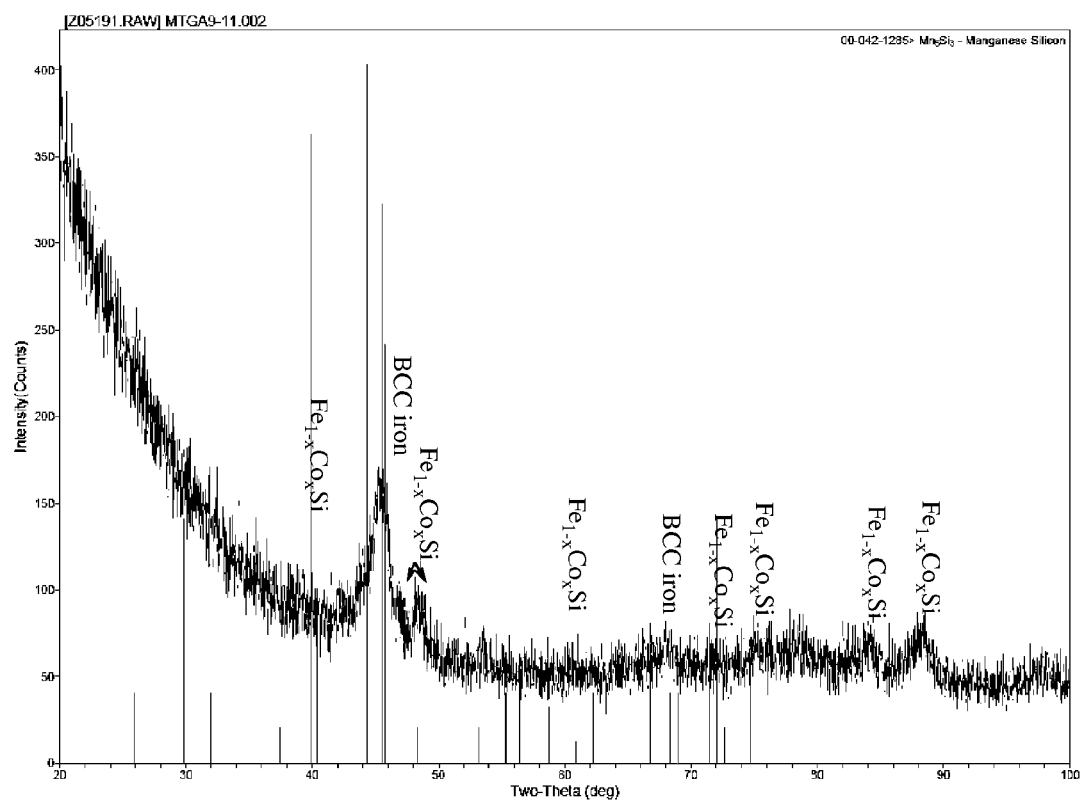
FIG. 11 shows an X-ray diffraction spectrum of the residue on pyrolysis of the product from Example 15 to 1000° C. at a fast rate in nitrogen.

Pyrolysis at a faster rate to 1000° C. of the thermoset from Example 15 under nitrogen—A portion (25 mg) of the product mixture was placed in a ceramic crucible in a TGA instrument and was thermally treated to 1000° C. at 10° C./min and was cooled to room temperature under nitrogen. A shaped ceramic sample resulted from the thermal treatment, which was analyzed by X-ray diffraction spectroscopy (FIG. 11). The product was found to contain a mixture of nanoparticles of BCC iron and $Fe_{1-x}Co_xSi$.

Example 17

Figure 12:
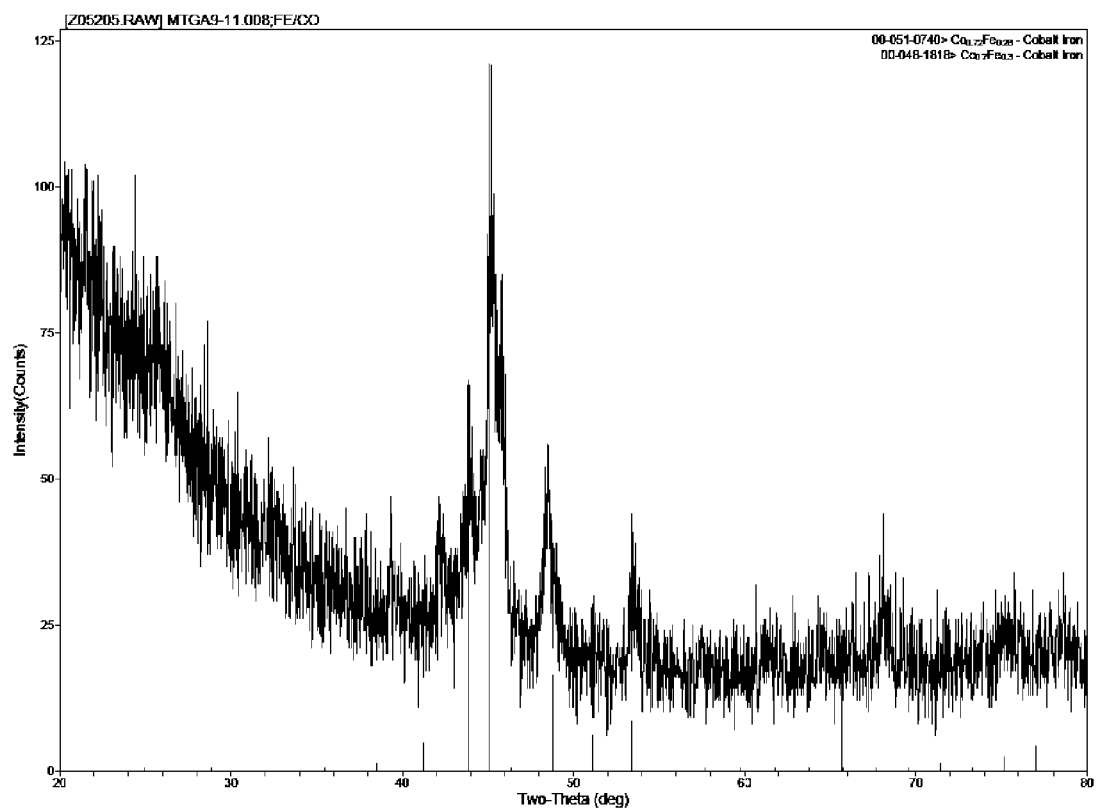
FIG. 12 shows an X-ray diffraction spectrum of the residue on pyrolysis of the product from Example 15 to 1000° C. at a slow rate in nitrogen.

Pyrolysis at a slower rate to 1000° C. of the thermoset from Example 15 under nitrogen—A portion (25 mg) of the product mixture was placed in a ceramic crucible in a TGA instrument and was thermally treated to 1000° C. as follows. The product was heated to 400° C. at 2° C./min and was held at this temperature for 5 minutes. It was subsequently heated to 1000° C. at 1° C./min and was cooled to room temperature at 5° C./min. A shaped ceramic sample resulted from the thermal treatment, which was analyzed by X-ray diffraction spectroscopy (FIG. 12). The product was found to contain a mixture of nanoparticles of $Fe_{0.72}Co_{0.28}$ and $Fe_{0.7}Co_{0.3}$.

Example 18

Functionalization of 1 with $Fe_2(CO)_9$ and $Mn_2(CO)_{10}$ at a ratio of 4:1 (polymer:metals(combined)) and Fe:Mn ratio of 2:1.6—0.500 g of 1 (2.77 mmol) was mixed with 0.142 g of $Fe_2(CO)_9$ (0.40 mmol) and 0.125 g of $Co_2(CO)_8$ (0.32 mmol) in a flame-dried 50 mL flask under argon. The mixture was dissolved in 25 mL of THF and was stirred at room temperature for 1 hour and subsequently refluxed for 15 h. After reflux, THF was removed from the product under vacuum to yield product precipitates.

Example 19

Figure 13:
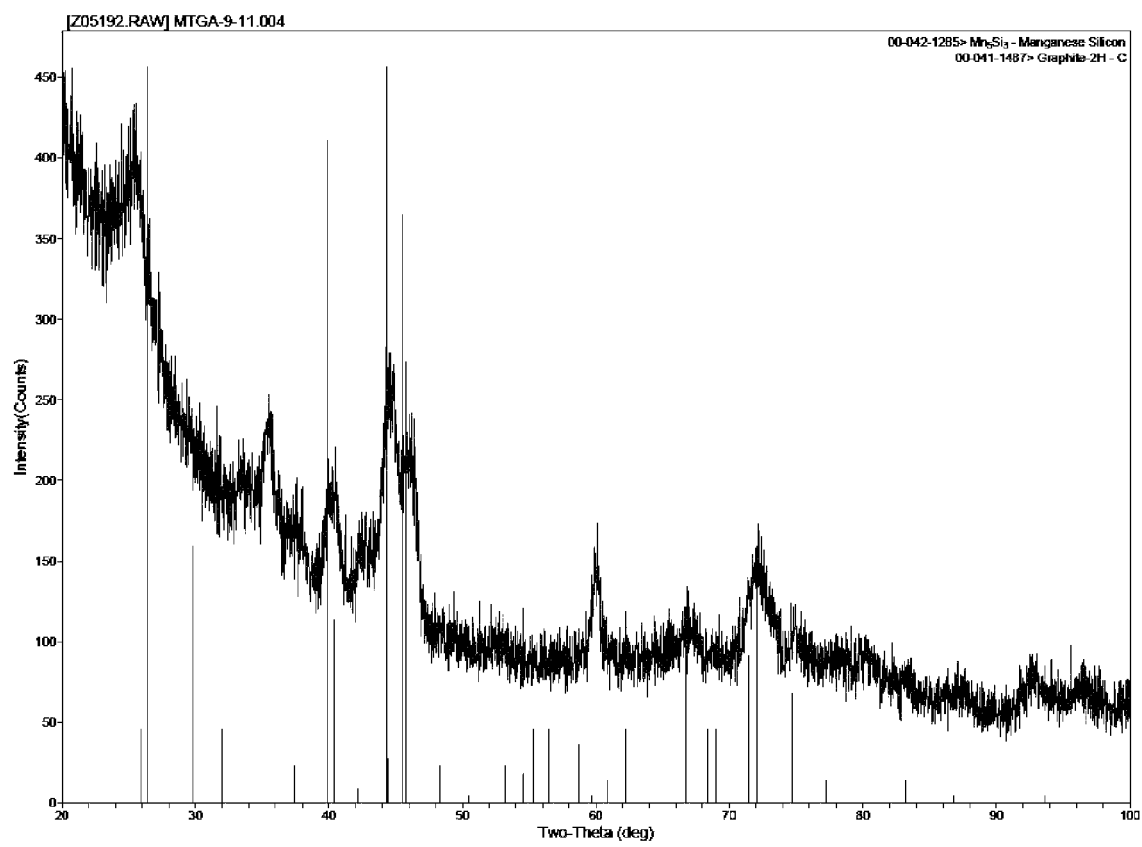
FIG. 13 shows an X-ray diffraction spectrum of the residue on pyrolysis of the product from Example 18 to 1000° C. at a fast rate in nitrogen.

Pyrolysis at a faster rate to 1000° C. of the thermoset from Example 18 under nitrogen—A portion (25 mg) of the product mixture was placed in a ceramic crucible in a TGA instrument and was thermally treated to 1000° C. at 10° C./min and was cooled to room temperature under nitrogen. A shaped ceramic sample resulted from the thermal treatment, which was analyzed by X-ray diffraction spectroscopy (FIG. 13). The product was found to contain a mixture of nanoparticles of antiferromagnetic $Mn_5Si_3$ and graphite/carbon nanotubes.

Example 20

Figure 14:
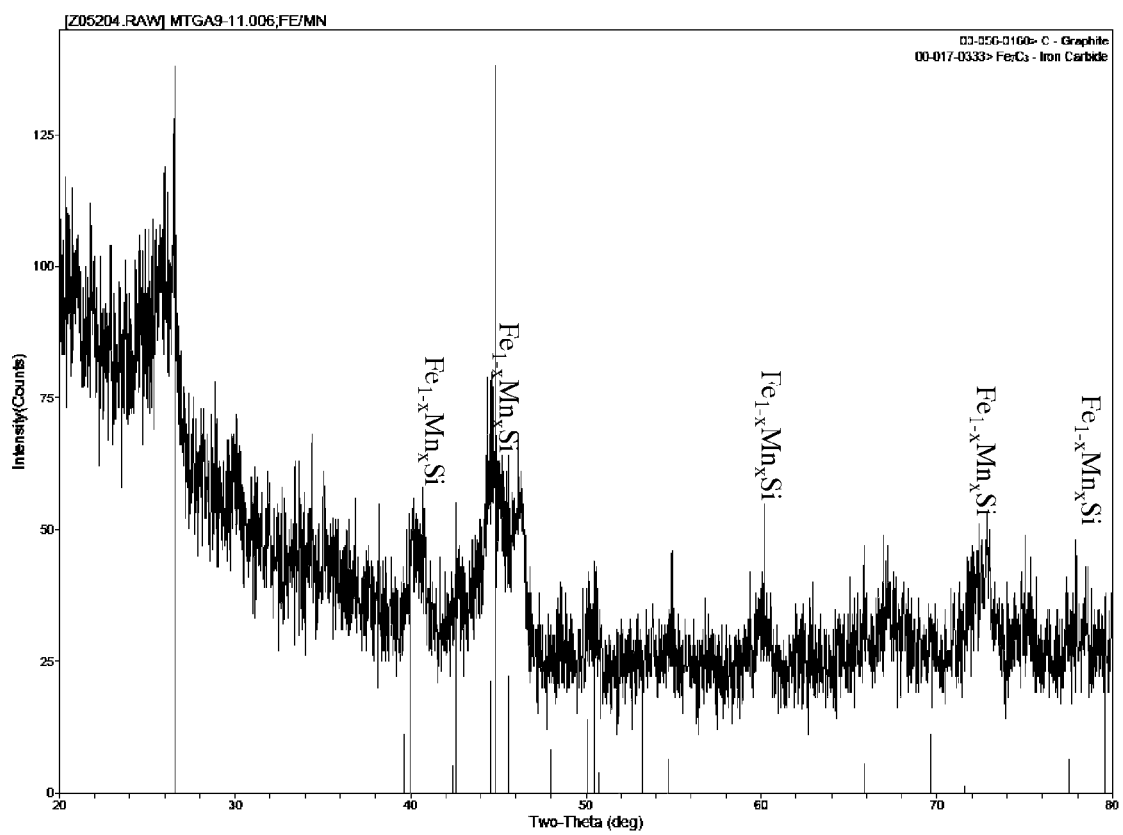
FIG. 14 shows an X-ray diffraction spectrum of the residue on pyrolysis of the product from Example 18 to 1000° C. at a slow rate in nitrogen.

Pyrolysis at a slower rate to 1000° C. of the thermoset from Example 18 under nitrogen—A portion (25 mg) of the product mixture was placed in a ceramic crucible in a TGA instrument and was thermally treated to 1000° C. as follows. The product was heated to 400° C. at 2° C./min and was held at this temperature for 5 minutes. It was subsequently heated to 1000° C. at 1° C./min and was cooled to room temperature at 5° C./min. A shaped ceramic sample resulted from the thermal treatment, which was analyzed by X-ray diffraction spectroscopy (FIG. 14). The product was found to contain a mixture of nanoparticles of $Fe_{1-x}Mn_xSi$, iron carbide ($Fe_7C_3$), and graphite.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A ceramic made by a method comprising:
   providing a composition comprising:
      one or more compounds having the formula:

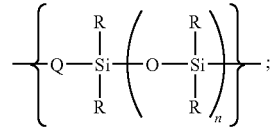

wherein each R is an independently selected organic group;
   wherein n is a positive integer; and
   wherein Q is an acetylenic repeat unit comprising one or more of acetylene group, crosslinked acetylene group, and $(ML_x)_y$-acetylene complex;
   wherein M is an independently selected metal;
   wherein each L is an independently selected ligand; and
   wherein x and y are positive integers; and
   one or more metallic components selected from:
      the $(ML_x)_y$-acetylene complex in the compound; and
      a metallic compound capable of reacting with the acetylenic repeat unit to form the $(ML_x)_y$-acetylene complex; and
   pyrolyzing the composition;
      wherein the ceramic comprises metallic nanoparticles.

2. The ceramic of claim 1, wherein each acetylenic repeat unit consists of two crosslinked or uncrosslinked groups independently selected from acetylene and $(ML_x)_y$-acetylene complex.

3. The ceramic of claim 1, wherein each M is independently selected from main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

4. The ceramic of claim 1, wherein each L is independently selected from carbonyl, cyclopentadienyl, pentamethylcyclopentadienyl, trimethylsilylcyclopentadienyl, hexafluoroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

5. The ceramic of claim 1, wherein the metallic compound capable of reacting with the acetylenic repeat unit is one or more of $Fe_2(CO)_9$, $Co_2(CO)_8$, and $Mn_2(CO)_{10}$.

6. The ceramic of claim 1, wherein n is 1.

7. The ceramic of claim 1, wherein each R is methyl.

8. The ceramic of claim 1, wherein the metallic compound is one or more of $V(CO)_6$, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Fe_2(CO)_9$, $Fe_3(CO)_{12}$, $Ru(CO)_5$, $Ru_3(CO)_{12}$, $Os(CO)_5$, $Os_3(CO)_{12}$, $Co_2(CO)_8$, $Co_3(CO)_{12}$, $Co_6(CO)_{16}$, $Rh_4(CO)_{12}$, $Rh_6(CO)_{16}$, $Ir_4(CO)_{12}$, $Ir_6(CO)_{16}$, $Ni(CO)_4$, $Cp(CH_3)_5Re(CO)_3$, $Cp(CH_3)_5Re(CO)_3$, $[Cp(CH_3)_5]_2Cr_2(CO)_4$, $Cp_2Fe_2(CO)_4$, $C_6H_8Fe(CO)_3$, $C_6H_8Fe(CO)_3$, $C_8H_8Fe(CO)_3$, $CpCr(CO)_3$, $Cp_2Mo_2(CO)_6$, $C_7H_8Mo(CO)_3$, $CpMn(CO)_3$, $Cp(Si(CH_3)_3)Mn(CO)_3$, $Cp(CH_3)_5Rh(CO)_2$, $Cp_2Ru_2(CO)_4$, (hexafluroacetylacetonate)Cu(cyclooctadiene), Cr(hexafluroacetylacetonate), Co(acetylacetonate) $(CH_3CN)_4$ Cu(hexafluroacetylacetonate), $(CH_3)_2Au$(acetylacetonate), (cyclooctadiene)Ir(acetylacetonate), Fe(acetylacetonate), Mn(acetylacetonate), MoO$_2$(acetylacetonate)$_2$, Ni(hexafluroacetylacetonate), Ni(cyclooctadiene)$_2$, Ni(SCN)$_2$, PdCl$_2$(CH$_3$CN)$_2$, Pd(NH$_3$)$_2$(NO$_2$)$_2$, Pt(NH$_3$)$_2$Cl$_2$, Rh(cyclooctadiene)$_2$(SO$_3$CF$_3$), Rh(cyclooctadiene)Cl$_2$, Zr(trifluoroacetylacetonate), MgCl$_2$, SmCl$_2$, and AlCl$_2$.

9. The ceramic of claim 1;
wherein the metallic nanoparticles comprise bcc Fe, fcc Fe, Fe$_{1-z}$Co$_z$Si, Fe$_{1-z}$Mn$_z$Si, Mn$_5$Si$_3$, Fe$_7$C$_3$, or Fe$_{1-z}$Co$_z$; and
wherein z is number between 0 and 1.

10. The ceramic of claim 1, wherein the ceramic comprises carbon nanotubes.

11. A method of making a ceramic comprising:
providing a composition comprising:
one or more compounds having the formula:

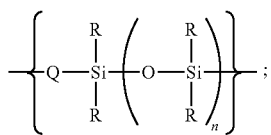

wherein each R is an independently selected organic group:
wherein n is a positive integer; and
wherein Q is an acetylenic repeat unit comprising one or more of acetylene group, crosslinked acetylene group, and (ML$_x$)$_y$-acetylene complex;
wherein M is an independently selected metal;
wherein each L is an independently selected ligand; and
wherein x and y are positive integers; and
one or more metallic components selected from:
the (ML$_x$)$_y$-acetylene complex in the compound; and
a metallic compound capable of reacting with the acetylenic repeat unit to form the (ML$_x$)$_y$-acetylene complex; and
pyrolyzing the composition;
wherein the ceramic comprises metallic nanoparticles.

12. The method of claim 11, wherein each acetylenic repeat unit consists of two crosslinked or uncrosslinked groups independently selected from acetylene and (ML$_x$)$_y$-acetylene complex.

13. The method of claim 11, wherein each M is independently selected from main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

14. The method of claim 11, wherein each L is independently selected from carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

15. The method of claim 11, wherein the metallic compound capable of reacting with the acetylenic repeat unit is one or more of Fe$_2$(CO)$_9$, Co$_2$(CO)$_8$, and Mn$_2$(CO)$_{10}$.

16. The method of claim 11, wherein n is 1.

17. The method of claim 11, wherein each R is methyl.

18. The method of claim 11, wherein the metallic compound is one or more of V(CO)$_6$, Cr(CO)$_6$, Mo(CO)$_6$, W(CO)$_6$, Mn$_2$(CO)$_{10}$, Tc$_2$(CO)$_{10}$, Re$_2$(CO)$_{10}$, Fe(CO)$_5$, Fe$_2$(CO)$_9$, Fe$_3$(CO)$_{12}$, Ru(CO)$_5$, Ru$_3$(CO)$_{12}$, Os(CO)$_5$, Os$_3$(CO)$_{12}$, Co$_2$(CO)$_8$, Co$_3$(CO)$_{12}$, Co$_6$(CO)$_{16}$, Rh$_4$(CO)$_{12}$, Rh$_6$(CO)$_{16}$, Ir$_4$(CO)$_{12}$, Ir$_6$(CO)$_{16}$, Ni(CO)$_4$, Cp(CH$_3$)$_5$Re(CO)$_3$, Cp(CH$_3$)$_5$ Re(CO)$_3$, [Cp(CH$_3$)$_5$]$_2$Cr$_2$(CO)$_4$, Cp$_2$Fe$_2$(CO)$_4$, C$_6$H$_8$Fe(CO)$_3$, C$_6$H$_8$Fe(CO)$_3$, C$_8$H$_8$Fe(CO)$_3$, CpCr(CO)$_3$, Cp$_2$Mo$_2$(CO)$_6$, C$_7$H$_8$Mo(CO)$_3$, CpMn(CO)$_3$, Cp(Si(CH$_3$)$_3$)Mn(CO)$_3$, Cp(CH$_3$)$_5$Rh(CO)$_2$, Cp$_2$Ru$_2$(CO)$_4$, (hexafluroacetylacetonate)Cu(cyclooctadiene), Cr(hexafluroacetylacetonate), Co(acetylacetonate)(CH$_3$CN)$_4$ Cu(hexafluroacetylacetonate), (CH$_3$)$_2$Au(acetylacetonate), (cyclooctadiene)Ir(acetylacetonate), Fe(acetylacetonate), Mn(acetylacetonate), MoO$_2$(acetylacetonate)$_2$, Ni(hexafluroacetylacetonate), Ni(cyclooctadiene)$_2$, Ni(SCN)$_2$, PdCl$_2$(CH$_3$CN)$_2$, Pd(NH$_3$)$_2$(NO$_2$)$_2$, Pt(NH$_3$)$_2$Cl$_2$, Rh(cyclooctadiene)$_2$(SO$_3$CF$_3$), Rh(cyclooctadiene)Cl$_2$, Zr(trifluoroacetylacetonate), MgCl$_2$, SmCl$_2$, and AlCl$_2$.

19. The method of claim 11;
wherein the metallic nanoparticles comprise bcc Fe, fcc Fe, Fe$_{1-z}$Co$_z$Si, Fe$_{1-z}$Mn$_z$Si, Mn$_5$Si$_3$, Fe$_7$C$_3$, or Fe$_{1-z}$Co$_z$; and
wherein z is number between 0 and 1.

20. The method of claim 11, wherein the ceramic comprises carbon nanotubes.

* * * * *